April 13, 1926.  1,581,064
E. P. KELLEY
HOSE COUPLING
Filed May 21, 1924  2 Sheets-Sheet 1
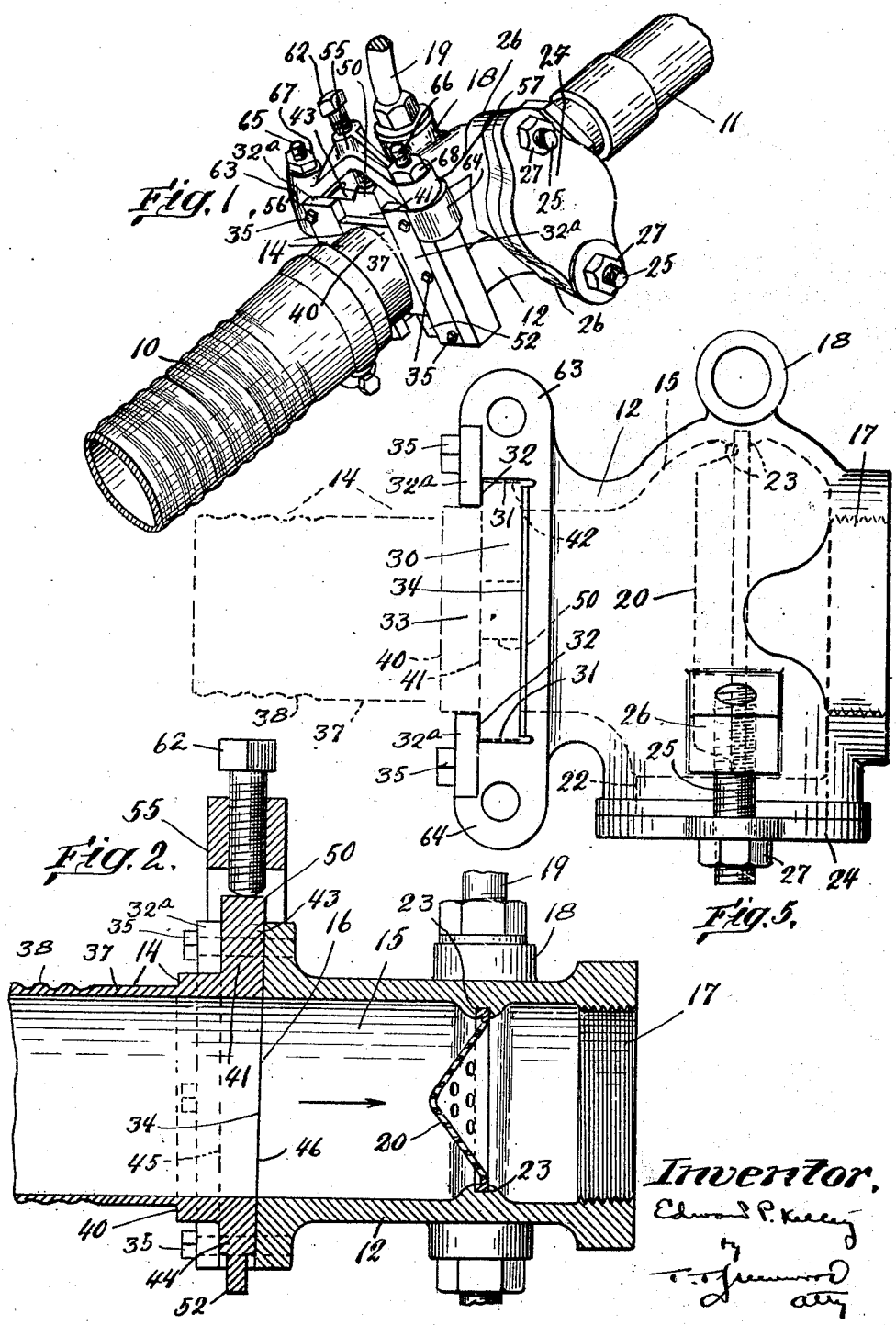
Inventor,
Edward P. Kelley
by
T. B. Drummond
atty April 13, 1926.
E. P. KELLEY
1,581,064
HOSE COUPLING
Filed May 21, 1924
2 Sheets-Sheet 2
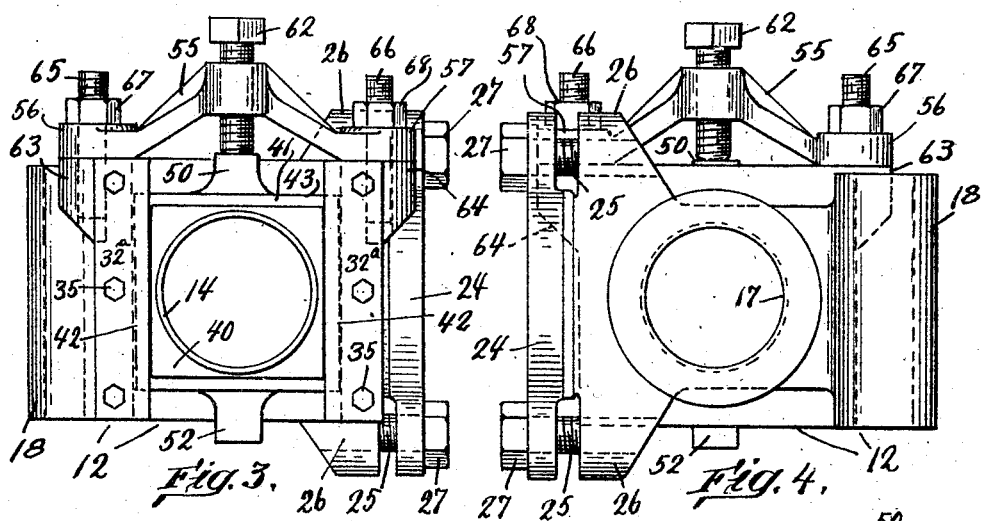
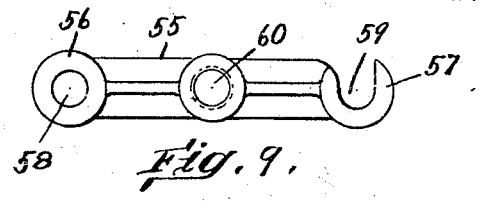
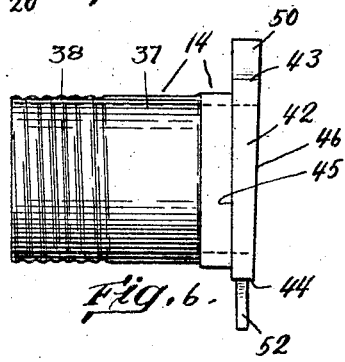
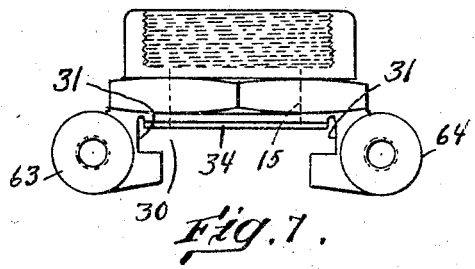
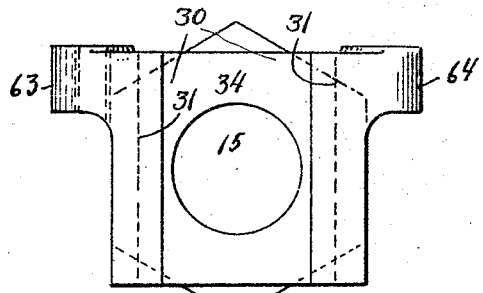
Inventor,
Edward P. Kelley
by
atty Patented Apr. 13, 1926.

1,581,064

UNITED STATES PATENT OFFICE.

EDWARD P. KELLEY, OF MITTINEAGUE, MASSACHUSETTS.

HOSE COUPLING.

Application filed May 21, 1924. Serial No. 714,965.

*To all whom it may concern:*

Be it known that I, EDWARD P. KELLEY, a citizen of the United States, residing at Mittineague, in the county of Hampden and State of Massachusetts, have invented an Improvement in Hose Couplings, of which the following is a specification.

This invention relates to a detachable hose coupling especially adapted for, although not necessarily limited to, connecting the feed water pipe of a locomotive boiler with the water tank of the tender.

The coupling with which this invention is particularly concerned comprises relatively-separable male and female members. Both members are provided with flat abutting faces formed with registering fluid passages therethrough, which faces are brought into fluid-tight engagement when the coupling members are connected. The female member is provided with a tapered or wedge-groove and the male member with a wedge-projection adapted to be received within the groove, whereby to draw the abutting faces into tight engagement.

In locomotive use, the coupling hose is suspended loosely from its end-coupling members and is subjected to considerable vibration, which vibration tends to disconnect or loosen the couplings and cause them to leak. It is imperative to maintain the coupling in fixed, fluid-tight engagement, and consequently it is an object of this invention to provide a quickly detachable coupling member of the type above set forth with a locking device which is arranged to exert a pressure upon the male and female coupling members in the direction of the wedging action and forcibly wedge the members into fluid-tight engagement, and hold them in such engagement against any separating action due to vibration or shocks incident to the motion of the locomotive.

For locomotive use, it is essential that the coupling be so constructed that it can be disconnected rapidly and, consequently, a further object of the invention is to so arrange the locking and pressure-applying device that it can be removed rapidly from locking and pressure-applying relation with the coupling members, while yet being connected with the coupling, and by a simple tool, as a wrench.

I prefer so to construct the male and female members of the coupling that there is a substantial wedging engagement between the abutting faces, even when the locking device is not in use, and I accomplish this by making the wedging angle relatively small, say less than about twelve degrees; and it is a further object of this invention to provide one of the coupling members, as the male member, with means by which it may be loosened from binding or wedging engagement with its cooperating member.

A further object is to provide inclined or tapered valve faces and straight rear walls instead of the usual straight faces and inclined rear walls as I find that the fluid-tight engagement between the coupling-members is enhanced thereby and the manufacture of the coupling is facilitated.

A further object is generally to improve the construction of separable couplings.

Fig. 1 is a perspective view of the coupling embodying this invention especially adapted to connect the flexible feed water hose detachably with the fixed feed water pipe of a locomotive.

Fig. 2 is a longitudinal sectional elevation through the coupling of Fig. 1 and disconnected from the hose and water pipe.

Fig. 3 is an end view of the coupling, looking towards the male coupling-member.

Fig. 4 is a view similar to Fig. 3 but looking towards the female coupling member.

Fig. 5 is a plan view of the female coupling member.

Fig. 6 is a side elevation of the male coupling member.

Figs. 7 and 8 are plan and end elevations, respectively, of a female coupling member wherein the strainer is omitted, and illustrating a modified construction.

Fig. 9 is a plan view of one of the elements of the locking and pressure-applying device.

The coupling illustrated in Fig. 1 is adapted detachably to connect the flexible hose 10 with the fixed feed water pipe 11 of a locomotive. The coupling includes the female coupling member 12 and the male coupling member 14. The female coupling member 12 is provided with a water passage 15 therethrough which has an entrance 16 and an internally screw-threaded outlet 17 by which said member is attached to and supported by said fixed pipe 11. Obviously, however, some other form of connection may be provided. Said member 12 may be formed or provided with a lateral apertured boss 18 in which a supporting rod 19 is received and fixed, by which to provide additional support for the coupling. A strainer 20 may be interposed in said passage 15 and, for this purpose, said coupling member may be provided with a lateral opening 22, through which said strainer is introduced, and said strainer may be slidably received removably in upper and lower grooves 23 formed in the wall of said female coupling member. A cover plate 24 may serve removably to cover said lateral opening 22 and hold the strainer within said coupling member and said cover plate may be retained removably in place by the stud-bolts 25 carried by lugs 26 of said coupling member, and nuts 27 threaded on said bolts. Said coupling member is formed with an enlargement at the inlet end thereof in which a substantially vertical groove 30 is formed, in which groove the male coupling member is adapted to be received. Said groove 30 has the substantially parallel side walls 31 and rear walls 32, which latter walls project inwardly toward each other and terminate in spaced relation to provide a throat 33 in which a part of the male coupling member is adapted to be positioned. Said groove 30 has the flat front abutting face 34 which is or may be substantially coextensive with the height of the female coupling member and within the borders of which is disposed the entrance 16 of the fluid passage through said member. In accordance with this invention, said abutting face 34 is inclined slightly, or is tapered, with respect to the horizontal axis of said coupling member, or the fluid passage therethrough, as shown in Figs. 2 and 5.

Said rear walls 32 are at substantial right angles with the horizontal axis of the coupling member and, consequently, a wedge-shaped groove or pocket is formed which is larger at the top than at the bottom in the direction of fluid flow through the coupling; and the male coupling member is adapted to enter said groove at the top and be wedged therein.

In Figs. 1 through 6 the rear walls 32 comprise separate end-plates 32ª, which plates are secured, by bolts 35, to the female coupling member while, in Fig. 7, said rear walls are integral with said coupling member. It is an object of this invention to provide separate rear walls as said rear walls are or may be subject to considerable strain and, when separate members, may be replaced readily if broken or otherwise damaged; and the separable construction, furthermore, is cheaper than the integral construction illustrated in Fig. 7.

The male coupling member 14 comprises a tubular body 37, which is adapted to enter the end of the flexible hose 10, and may have corrugations 38 or be otherwise formed to effect secure engagement with said hose. Said tubular body is or may be provided with a substantially square and enlarged boss 40 the opposite sides of which are adapted sildably to be received within the throat 33 of the female coupling member and hold the two coupling members against lateral displacement. Said boss is formed or provided with a rectangular flange 41 which has the outstanding lateral portions 42 and the outstanding top and bottom portions 43 and 44. The rear face 45 of said flange is formed at substantial right angles to the longitudinal axis of said coupling member, or the fluid passage therethrough, while the forward or abutting face 46 is inclined with respect to said axis whereby the flange is thicker at the top than at the bottom, and is adapted to conform to the groove in the female coupling member. The flange of the male coupling member is adapted to be inserted in the groove in the female coupling member from the top of the groove; and will be wedged in said groove with the flat abutting faces in fluid tight engagement and with the water passages through said coupling members in approximate alignment. Preferably the wedge-angle between the front and rear walls of the groove and flange is relatively small, whereby the two members may be frictionally retained in engagement. The top face of the flange may be formed with an upstanding boss 50, which boss preferably is higher than the upper face of the female coupling member; and said boss may be struck a blow with a hammer or other suitable tool to drive the two coupling members into firm engagement. Preferably, also, the lower face of said flange is formed or provided with a similar boss 52 which extends below the lower face of the female coupling member and is adapted to be struck by a hammer to dislodge the male coupling member from its wedging connection with the female coupling member.

While the wedging action between the two coupling members is intended to contribute materially toward maintaining them in fluid tight engagement such action is not relied upon for a positive lock and, in accordance with this invention, especial means are provided to exert a pressure on the two members, in the direction of wedging action, whereby to drive the two members forcibly into fluid tight engagement; and the pressure-applying means is arranged to maintain such pressure and serve as a lock against the unintentional separation of the members.

Said locking and pressure-applying means includes a yoke 55, which yoke is formed or provided with bosses 56 and 57 at its ends. Said boss 56 is formed with a bolt-receiving aperture 58 therein and said boss 57 is formed with a slot 59 therein. The middle portion of said yoke preferably is raised above the ends thereof, or the yoke has an arch-formation, and a screw-threaded aperture 60 is formed in said raised portion in which a locking and pressure-applying screw 62 is adjustably screw-threaded.

Said yoke is adapted to be disposed above the groove 30 in said female coupling member removably in position to apply pressure to said male coupling member in the direction of the wedging action. Said female coupling member is formed or provided with outstanding lugs 63 and 64, which lugs are disposed at the upper portion of said member and beyond the sides 31 of said groove therein, and stud-bolts 65 and 66 are screw-threaded in said lugs. Said yoke is received on said bolts and is secured removably in position thereon by the nuts 67 and 68. The arrangement of the yoke and the slot 59 therein is such that, by loosening said nuts 67 and 68 slightly, the yoke may be swung about the bolt 65 as a pivot and into a position away from locking and pressure-applying relation with the male coupling member, whereby to permit the coupling members to be separated.

Said pressure-applying screw 62, in the locking position of the yoke, is disposed above the boss 50 of the male coupling member and is adapted to be forced down upon said boss, whereby to apply a pressure on the male coupling member in the direction of wedging action, thereby to force the two coupling members into secure fluid-tight engagement, and hold them firmly in such engagement until said screw 62 is backed off. The coupling may be disconnected by loosening the nuts 67 and 68 and swinging the yoke to one side and striking a blow upon the bottom boss 52 of the male coupling member, whereby to break the wedging engagement of the two members, whereupon the male coupling member may be raised out of the wedge-groove in the female coupling member.

Figs. 7 and 8 show a female coupling member wherein the strainer 20 is omitted and the rear walls of the groove 30 are integral with the body of the member.

It is to be noted that the construction above set forth provides a positive fluid-tight joint, without the use of gaskets or other packing material and the joint may be rapidly broken and made without the delays necessary with the use of a packing material.

The construction may be otherwise modified without departing from the spirit of the invention.

I claim:

1. A hose coupling comprising complemental coupling members in longitudinal alignment with each other and having openings therethrough, said coupling members terminating in smooth transverse faces inclined to the longitudinal axis of the coupling, and means for drawing said complemental coupling members together to form a fluid-tight joint by their close abutting relation comprising wedge means formed in part by said inclined faces and rigid adjustable means cooperating with said wedge means for forcing said coupling members into wedging engagement, said adjustable means comprising a member mounted for movement longitudinally thereof and adapted to bear on one only of said coupling members.

2. The combination with a two part conduit, of a coupling therefor comprising a male member associated with one part of said conduit and a female member associated with the other part of said conduit, said coupling members having openings therethrough in alignment with each other and with the conduit and terminating in smooth faces inclined to the longitudinal axis of the coupling and adapted to form a fluid tight joint by their close abutting relation, and means for forcing said faces toward each other and locking them in close abutting, fluid tight relation comprising a yoke carried by said female coupling member removably in position over said male coupling member, and rigid adjustable means carried by said yoke and arranged to bear against said male coupling member, said yoke being swingable laterally from position clear of said coupling members.

In testimony whereof, I have signed my name to this specification.

EDWARD P. KELLEY.